(12) United States Patent
Bando et al.

(10) Patent No.: US 12,334,590 B2
(45) Date of Patent: Jun. 17, 2025

(54) NONAQUEOUS ELECTROLYTE SECONDARY BATTERY SEPARATOR, NONAQUEOUS ELECTROLYTE SECONDARY BATTERY MEMBER, AND NONAQUEOUS ELECTROLYTE SECONDARY BATTERY

(71) Applicant: Sumitomo Chemical Company, Limited, Tokyo (JP)

(72) Inventors: Akinori Bando, Ichihara (JP); Daisuke Yamaguchi, Ichihara (JP); Atsuhiro Takata, Osaka (JP); Yuki Yoneguchi, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 593 days.

(21) Appl. No.: 17/706,701

(22) Filed: Mar. 29, 2022

(65) Prior Publication Data

US 2022/0328935 A1 Oct. 13, 2022

(30) Foreign Application Priority Data

Mar. 30, 2021 (JP) ................. 2021-058381

(51) Int. Cl.
*H01M 50/494* (2021.01)
*H01M 50/417* (2021.01)
(Continued)

(52) U.S. Cl.
CPC ....... *H01M 50/494* (2021.01); *H01M 50/417* (2021.01); *H01M 50/423* (2021.01); *H01M 50/449* (2021.01); *H01M 50/491* (2021.01)

(58) Field of Classification Search
None
See application file for complete search history.

(56) References Cited

U.S. PATENT DOCUMENTS

2003/0017386 A1* 1/2003 Daido ............... H01M 10/0525
429/142
2008/0096102 A1* 4/2008 Hatayama ........... H01M 50/431
521/63
(Continued)

FOREIGN PATENT DOCUMENTS

JP 2017-103044 A 6/2017
JP 2017-141428 A 8/2017
(Continued)

*Primary Examiner* — Haroon S. Sheikh
(74) *Attorney, Agent, or Firm* — Panitch Schwarze Belisario & Nadel LLP

(57) ABSTRACT

A nonaqueous electrolyte secondary battery separator having excellent impact absorbency includes a polyolefin porous film having a full width W at half maximum of a peak of an MD component of not less than 30 degrees. The full width W at half maximum of the peak of the MD component is calculated from an azimuthal profile of a scattering peak on a plane obtained by wide-angle X-ray scattering measurement that is carried out by irradiating a surface of the polyolefin porous film with an X-ray from a direction vertical to the surface of the polyolefin porous film, and/or having a maximum-to-minimum intensity ratio r of not more than 3.6. The maximum-to-minimum intensity ratio r is calculated from a Fourier transformed azimuthal profile obtained by observing the surface of the polyolefin porous film by SEM.

7 Claims, 2 Drawing Sheets

(51) Int. Cl.
    *H01M 50/423*     (2021.01)
    *H01M 50/449*     (2021.01)
    *H01M 50/491*     (2021.01)

(56) References Cited

U.S. PATENT DOCUMENTS

| | | | | |
|---|---|---|---|---|
| 2011/0293989 | A1* | 12/2011 | Hasegawa | C08L 23/02 |
| | | | | 524/427 |
| 2017/0155115 | A1* | 6/2017 | Takata | H01M 50/423 |
| 2018/0254450 | A1 | 9/2018 | Azuma | |
| 2018/0254460 | A1 | 9/2018 | Arise et al. | |
| 2019/0157647 | A1 | 5/2019 | Kidosaki et al. | |
| 2019/0252658 | A1* | 8/2019 | Yoshimaru | H01M 50/429 |
| 2019/0273234 | A1 | 9/2019 | Azuma | |
| 2022/0181744 | A1* | 6/2022 | Takahashi | H01M 50/491 |

FOREIGN PATENT DOCUMENTS

| | | |
|---|---|---|
| JP | 2018-147688 A | 9/2018 |
| JP | 2018-147692 A | 9/2018 |

\* cited by examiner

NONAQUEOUS ELECTROLYTE SECONDARY BATTERY SEPARATOR, NONAQUEOUS ELECTROLYTE SECONDARY BATTERY MEMBER, AND NONAQUEOUS ELECTROLYTE SECONDARY BATTERY

This Nonprovisional application claims priority under 35 U.S.C. § 119 on Patent Application No. 2021-058381 filed in Japan on Mar. 30, 2021, the entire contents of which are hereby incorporated by reference.

TECHNICAL FIELD

The present invention relates to a separator for a nonaqueous electrolyte secondary battery (hereinafter referred to as a "nonaqueous electrolyte secondary battery separator"), a member for a nonaqueous electrolyte secondary battery (hereinafter referred to as a "nonaqueous electrolyte secondary battery member"), and a nonaqueous electrolyte secondary battery.

BACKGROUND ART

Nonaqueous electrolyte secondary batteries such as a lithium secondary battery are currently in wide use as (i) batteries for devices such as a personal computer, a mobile telephone, and a portable information terminal or (ii) on-vehicle batteries.

Known as a separator for use in such a nonaqueous electrolyte secondary battery is, for example, a separator including a porous film which contains polyolefin as a main component.

For example, Patent Literature 1 describes that a separator including a porous film which contains polyethylene as a main component, wherein a c-axis of a crystal of the polyethylene has a high orientation degree in the machine direction (MD), has excellent cuttability and has a low shutdown temperature, and is useful as a nonaqueous electrolyte secondary battery separator.

CITATION LIST

Patent Literature

[Patent Literature 1]
Japanese Patent Application Publication Tokukai No. 2017-103044

SUMMARY OF INVENTION

Technical Problem

However, the conventional separator described above has room for improvement in impact absorbency.

An object of an aspect of the present invention is to provide a nonaqueous electrolyte secondary battery separator that has excellent impact absorbency while maintaining good ion permeability, good tear resistance, and good flexibility.

Solution to Problem

Conventionally, it has been considered that, like the separator described in Patent Literature 1, a separator in which a c-axis of a crystal of polyethylene has, for example, a high orientation degree in the MD is more useful as a nonaqueous electrolyte secondary battery separator.

However, unexpectedly, the inventors of the present invention arrived at the present invention after discovering that a separator including a porous film which contains polyolefin as a main component, wherein molecular chains of the polyolefin have a low orientation degree, has excellent impact absorbency and is useful as a nonaqueous electrolyte secondary battery separator.

The present invention includes the following aspects.

[1] A nonaqueous electrolyte secondary battery separator including:
  a polyolefin porous film,
  the polyolefin porous film satisfying any one or more of the following conditions (1) and (2):
  (1) a full width W at half maximum of a peak of an MD component is not less than 30 degrees, the full width W at half maximum of the peak being calculated from an azimuthal profile of a scattering peak on a (110) plane obtained by wide-angle X-ray scattering measurement that is carried out by irradiating a surface of the polyolefin porous film with an X-ray from a direction vertical to the surface of the polyolefin porous film,
    wherein, assuming that, in the azimuthal profile, a peak height is a difference between a maximum scattering intensity of a peak observed in a TD and a minimum scattering intensity of a valley which is adjacent to the peak and has a lowest intensity, the full width W at half maximum of the peak is a width of the peak at a scattering intensity at which the peak height is halved; and
  (2) a maximum-to-minimum intensity ratio r is not more than 3.6 in a Fourier transformed azimuthal profile obtained by observing the surface of the polyolefin porous film by SEM,
    wherein the maximum-to-minimum intensity ratio r is calculated, with use of a maximum value $I_{max1}$ and a minimum value $I_{min1}$ in a range of 45 degrees to 135 degrees and a maximum value $I_{max2}$ and a minimum value $I_{min2}$ in a range of 135 degrees to 225 degrees in the Fourier transformed azimuthal profile, by the following formula (A):

$$r=(I_{max1}/I_{min1}+I_{max2}/I_{min2})/2 \tag{A}$$

[2] The nonaqueous electrolyte secondary battery separator described in [1], wherein the polyolefin porous film satisfies the following (a) to (e):
  (a) a film thickness is not less than 5 μm and less than 18 μm;
  (b) an air permeability (Gurley value) per film thickness of 13 μm is 50 sec/100 cc to 200 sec/100 cc;
  (c) an MD breaking elongation ratio is not less than 20% GL;
  (d) an MD breaking strength is 50 MPa to 190 MPa; and
  (e) a TD breaking elongation ratio is 20% GL to 300% GL.

[3] The nonaqueous electrolyte secondary battery separator described in [1] or [2], wherein the polyolefin porous film contains a wax component having a weight-average molecular weight of 1,000 to 4,000.

[4] The nonaqueous electrolyte secondary battery separator described in any one of [1] to [3], further including:
  a porous layer containing a resin,
  the porous layer being formed on one surface or on both surfaces of the polyolefin porous film.

[5] A nonaqueous electrolyte secondary battery member including:
- a positive electrode;
- the nonaqueous electrolyte secondary battery separator according to any one of [1] to [4]; and
- a negative electrode,
- the positive electrode, the nonaqueous electrolyte secondary battery separator, and the negative electrode being arranged in this order.

[6] A nonaqueous electrolyte secondary battery including:
- the nonaqueous electrolyte secondary battery separator according to any one of [1] to [4].

Advantageous Effects of Invention

A nonaqueous electrolyte secondary battery separator in accordance with an embodiment of the present invention yields the effect of having excellent impact absorbency while maintaining good ion permeability, good tear resistance, and good flexibility.

DESCRIPTION OF EMBODIMENTS

Figure 1:
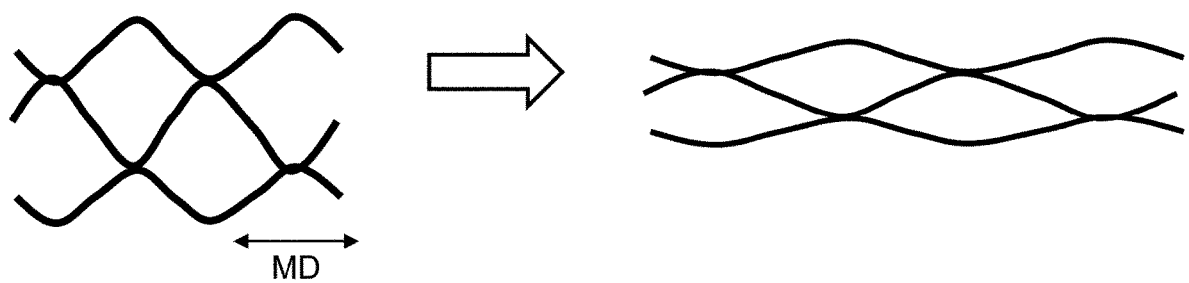
FIG. 1 is a schematic diagram illustrating a change of an internal structure of a polyolefin porous film of which a nonaqueous electrolyte secondary battery separator in accordance with an embodiment of the present invention is made, when impact is applied to the nonaqueous electrolyte secondary battery separator.

The following description will discuss embodiments of the present invention. Note, however, that the present invention is not limited to these embodiments. The present invention is not limited to arrangements described below, but may be altered in various ways by a skilled person within the scope of the claims. The present invention also encompasses, in its technical scope, any embodiment derived by combining technical means disclosed in differing embodiments. Any numerical range expressed as "A to B" herein means "not less than A and not more than B" unless otherwise stated.

Herein, the term "machine direction" (MD) refers to a direction which a polyolefin resin composition in sheet form, a primary sheet, a secondary sheet, and a porous film are conveyed in the below-described method of producing the porous film. The term "transverse direction" (TD) refers to a direction which is (i) perpendicular to the MD and (ii) parallel to the surface of the polyolefin resin composition in sheet form, the surface of the primary sheet, the surface of the secondary sheet, and the surface of the porous film.

Embodiment 1: Nonaqueous Electrolyte Secondary Battery Separator

1. Nonaqueous Electrolyte Secondary Battery Separator

A nonaqueous electrolyte secondary battery separator in accordance with an embodiment of the present invention is a nonaqueous electrolyte secondary battery separator including a polyolefin porous film, the polyolefin porous film satisfying any one or more of the following conditions (1) and (2):

(1) a full width W at half maximum of a peak of an MD component is not less than 30 degrees, the full width W at half maximum of the peak being calculated from an azimuthal profile of a scattering peak on a (110) plane obtained by wide-angle X-ray scattering measurement that is carried out by irradiating a surface of the polyolefin porous film with an X-ray from a direction vertical to the surface of the polyolefin porous film, wherein, assuming that, in the azimuthal profile, a peak height is a difference between a maximum scattering intensity of a peak observed in a TD and a minimum scattering intensity of a valley which is adjacent to the peak and has a lowest intensity, the full width W at half maximum of the peak is a width of the peak at a scattering intensity at which the peak height is halved; and (2) a maximum-to-minimum intensity ratio r is not more than 3.6 in a Fourier transformed azimuthal profile obtained by observing the surface of the polyolefin porous film by a scanning electron microscope, wherein the maximum-to-minimum intensity ratio r is calculated, with use of a maximum value $I_{max1}$ and a minimum value $I_{min1}$ in a range of 45 degrees to 135 degrees and a maximum value $I_{max2}$ and a minimum value $I_{min2}$ in a range of 135 degrees to 225 degrees in the Fourier transformed azimuthal profile, by the following formula (A):

$$r=(I_{max1}/I_{min1}+I_{max2}/I_{min2})/2 \qquad (A).$$

The nonaqueous electrolyte secondary battery separator in accordance with an embodiment of the present invention includes a polyolefin porous film. Hereinafter, the polyolefin porous film may also be referred to simply as a "porous film".

The nonaqueous electrolyte secondary battery separator in accordance with an embodiment of the present invention may be a nonaqueous electrolyte secondary battery separator that consists of the porous film. The nonaqueous electrolyte secondary battery separator in accordance with an embodiment of the present invention may be a nonaqueous electrolyte secondary battery separator that is a laminate including the porous film and a porous layer (described later).

Hereinafter, a nonaqueous electrolyte secondary battery separator that is the laminate (described later) may also be referred to as a "nonaqueous electrolyte secondary battery laminated separator".

The nonaqueous electrolyte secondary battery separator in accordance with an embodiment of the present invention may, as necessary, include, in addition to the porous film and the porous layer, another porous layer that is a publicly known porous layer such as a heat-resistant layer, an adhesive layer, and/or a protective layer as described later.

[Porous Film]

The porous film contains a polyolefin-based resin. Typically, the porous film contains the polyolefin-based resin as a main component. Note that the phrase "contains a polyolefin-based resin as a main component" means that a porous film contains a polyolefin-based resin at a proportion of not less than 50% by volume, preferably not less than 90% by volume, and more preferably not less than 95% by volume, relative to the entire amount of materials of which the porous film is made.

The porous film has many pores connected to one another. This allows a gas and a liquid to pass through the porous film from one side to the other side.

The porous film in accordance with an embodiment of the present invention has a full width W at half maximum of a peak of the MD component of not less than 30 degrees, the full width W at half maximum of the peak of the MD component being calculated from an azimuthal profile of a scattering peak on a (110) plane, and/or has a maximum-to-minimum intensity ratio r of not more than 3.6, the maximum-to-minimum intensity ratio r being calculated from a Fourier transformed azimuthal profile obtained by observing the surface of the porous film by a scanning electron microscope (hereinafter referred to as "SEM").

[Full Width W at Half Maximum of Peak of MD Component]

The full width W at half maximum of the peak of the MD component (hereinafter referred to as "full width W at half maximum of the peak") is a parameter indicating the degree of disorder in the orientation of the molecular chains of the polyolefin inside the porous film in the MD. Note that the molecular chains of the polyolefin constitute a dendritic structure that forms pores inside the porous film. A larger full width W at half maximum of the peak means a higher degree of disorder in the orientation and a lower orientation degree of the molecular chains of the polyolefin in the MD.

Since the porous film having the full width W at half maximum of the peak of not less than 30 degrees has a low orientation degree of the molecular chains of the polyolefin in the MD, the dendritic structure inside the porous film has a margin to elongate in the MD, as shown in the left-side diagram in FIG. 1.

Here, when impact energy is applied to the porous film from outside, the porous film can absorb the impact energy since the dendritic structure elongates in the MD as shown in the right-side diagram in FIG. 1. Further, when the impact energy is applied in the TD, a force for elongating the internal structure of the porous film acts more strongly in the MD.

Therefore, the nonaqueous electrolyte secondary battery separator, in accordance with an embodiment of the present invention, including the porous film having the full width W at half maximum of the peak of not less than 30 degrees is excellent in impact absorbency and particularly in impact absorbency in the TD.

A larger value of the full width W at half maximum of the peak is preferable since it allows the nonaqueous electrolyte secondary battery separator to exhibit more excellent impact absorbency. Specifically, the full width W at half maximum of the peak is preferably not less than 40 degrees and more preferably not less than 50 degrees. Further, an excessively large full width W at half maximum of the peak leads to an excessively low orientation degree of a dendritic structure inside the porous film, and thus may decrease the strength of the porous film itself. From the viewpoint of optimizing the strength, the full width W at half maximum of the peak is preferably not more than 90 degrees and more preferably not more than 70 degrees.

The full width W at half maximum of the peak can be calculated based on an azimuth profile of a scattering peak obtained by wide-angle X-ray scattering measurement. Specifically, the full width W at half maximum of the peak is measured by, for example, a method indicated by (1), (2), and (3) below or a method indicated by (1), (2), and (3') below.

(1) Wide-angle X-ray scattering measurement is carried out by irradiating a surface of a nonaqueous electrolyte secondary battery separator with an X-ray from a direction vertical to the surface of the nonaqueous electrolyte secondary battery separator, so that a two-dimensional scattering image is obtained. The two-dimensional scattering image is corrected by using a two-dimensional scattering image (air blank) acquired without installation of a measurement sample, so that a corrected two-dimensional scattering image is obtained. The above phrase "irradiating a surface of a nonaqueous electrolyte secondary battery separator with an X-ray from a direction vertical to the surface of the nonaqueous electrolyte secondary battery separator" means irradiating the surface of the nonaqueous electrolyte secondary battery separator with an X-ray such that an angle (angle of irradiation of the surface with the X-ray) between the X-ray emitted from an X-ray irradiation device (for example, NANO-Viewer manufactured by Rigaku Corporation (described later)) and the surface of the nonaqueous electrolyte secondary battery separator is 90 degrees.

(2) From the corrected two-dimensional scattering image, an azimuthal profile is calculated by making a plot, for a peak of scattering on a (110) plane of an orthorhombic crystal of a polyolefin polymer, with respect to the azimuth angle $\beta$ such that the TD is 180 degrees.

Figure 2:
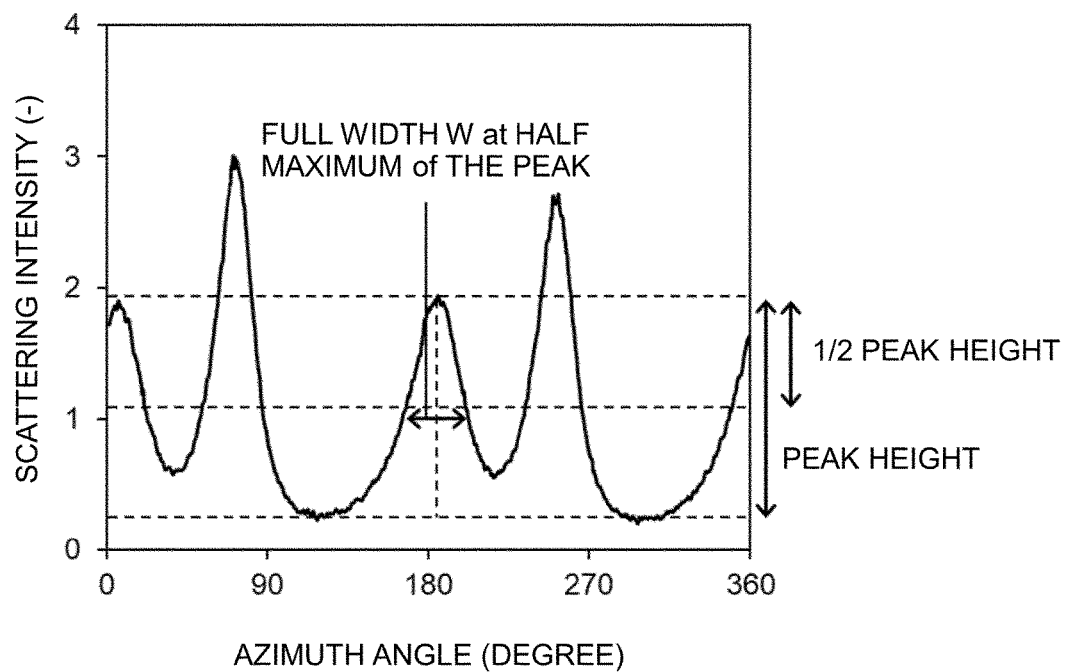
FIG. 2 is a diagram illustrating an example of how to obtain a full width W at half maximum when peaks do not overlap in an azimuthal profile of wide-angle X-ray scattering.

(3) As shown in FIG. 2, assuming that, in the azimuthal profile, a peak height is a difference between a maximum scattering intensity of a peak observed in the TD and a minimum scattering intensity of a valley which is adjacent to the peak and has the lowest intensity, a width of the peak at a scattering intensity at which the peak height is halved is calculated as a full width W at half maximum of the MD component.

Figure 3:
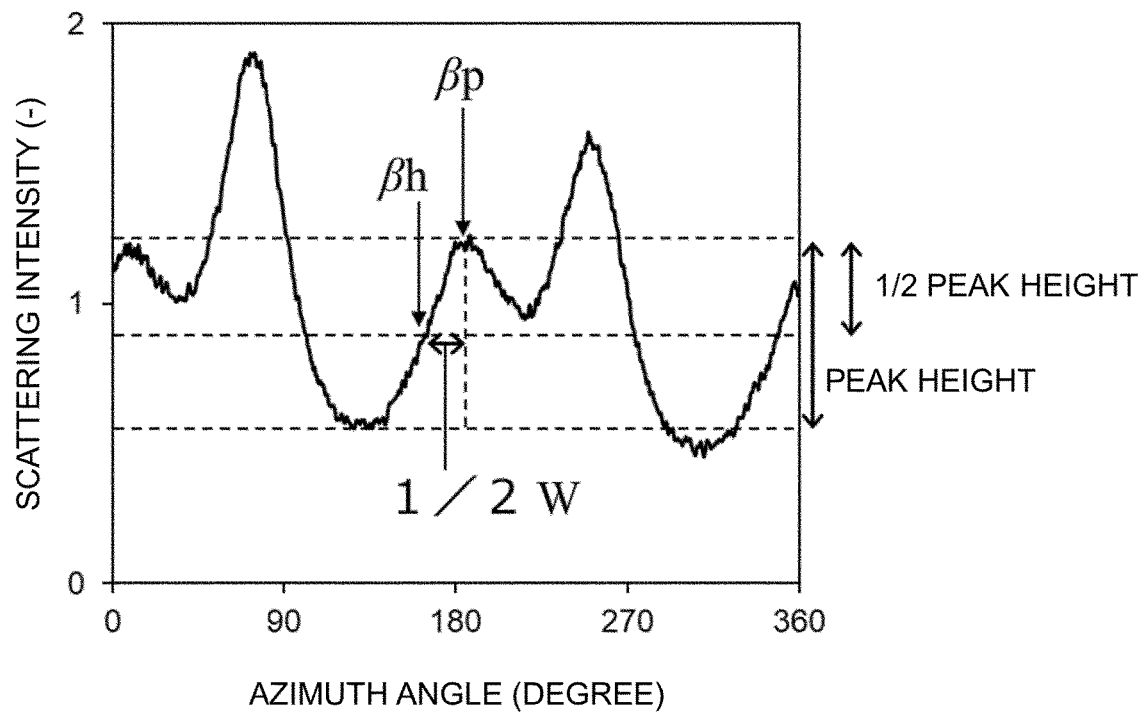
FIG. 3 is a diagram illustrating an example of how to obtain the full width W at half maximum when peaks overlap in an azimuthal profile of wide-angle X-ray scattering.

(3') As shown in FIG. 3, when one side of a peak observed in the TD overlaps an adjacent peak, an angle that is twice an absolute value of a difference between an azimuth angle $\beta h$ and an azimuth angle $\beta p$ is calculated as the full width W at half maximum based on the following formula (B), wherein the azimuth angle $\beta h$ is an angle corresponding to the scattering intensity of the peak at which the peak height is halved, and the azimuth angle $\beta p$ is an angle corresponding to a maximum scattering intensity of the peak.

$$W=2\times|\beta h-\beta p| \quad (B)$$

The position of the peak observed in the TD varies depending on, for example, the type of the polyolefin. For example, when the polyolefin is polyethylene, the peak observed in the TD is detected at a position corresponding to a scattering angle $2\theta$ of 20 degrees to 23 degrees.

[Maximum-to-Minimum Intensity Ratio r]

The maximum-to-minimum intensity ratio r is a parameter representing the orientation of the molecular chains of the polyolefin of the whole inside of the porous film. A lower maximum-to-minimum intensity ratio r means a lower orientation degree of the molecular chains of the polyolefin in the whole inside of the porous film.

The porous film having the maximum-to-minimum intensity ratio r of not more than 3.6 in an embodiment of the present invention has a low orientation degree of the molecular chains of the polyolefin in the whole inside of the porous film. Thus, the dendritic structure inside the porous film has a margin to elongate not only in the MD described above but also in the TD.

Here, when impact energy is applied to the porous film from outside, the porous film can absorb the impact energy since the dendritic structure inside the porous film elongates in the MD and in the TD. In general, a porous film easily elongates in the TD. Thus, it is considered that the porous film having the maximum-to-minimum intensity ratio r of not more than 3.6 can easily elongate in the TD and absorb impact energy in the MD more strongly.

Therefore, the nonaqueous electrolyte secondary battery separator including the porous film having the maximum-to-minimum intensity ratio r of not more than 3.6 is excellent in impact absorbency and particularly in impact absorbency in the MD.

A lower maximum-to-minimum intensity ratio r is preferable since it allows the nonaqueous electrolyte secondary battery separator to exhibit more excellent impact absorbency. Specifically, the maximum-to-minimum intensity ratio r is preferably not more than 3.2 and more preferably not more than 2.6. Further, an excessively small maximum-to-minimum intensity ratio r leads to an excessively low orientation degree of the dendritic structure inside the porous film, and thus may decrease the strength of the porous film itself. From the viewpoint of optimizing the strength of the porous film itself, the maximum-to-minimum intensity ratio r is preferably not less than 1.0, more preferably not less than 1.5, and particularly preferably not less than 2.0.

The maximum-to-minimum intensity ratio r can be calculated based on the Fourier transformed azimuthal profile obtained by observing the surface of the porous film by SEM. Specifically, the maximum-to-minimum intensity ratio r is measured by, for example, a method indicated by (1) to (6) below.

(1) A conductive treatment is performed on the surface of the porous film, and thereafter, the surface of the porous film is observed by SEM such that the MD is a horizontal direction of an image, and a secondary electron image of the surface is obtained. The observation by SEM is performed in three different fields of view on the surface of the sample (porous film).

(2) The secondary electron images in the three different fields of view are each trimmed into squares of 889 pixels×889 pixels (17.6 μm square). After that, binarization is performed by Otsu's automatic discrimination method, and binarized images are obtained. Subsequently, the binarized images are circularly masked by painting an area outside a circle having a diameter which is a width of the image with black, so that masked images are obtained.

(3) The masked images in the three different fields of view are each converted into power spectrum images by two-dimensional Fourier transform to obtain power spectrum images in a range corresponding to a period of 0.2 μm to 1 μm. Based on the power spectrum images, azimuthal profiles with the TD as 0 degree are calculated.

Figure 4:
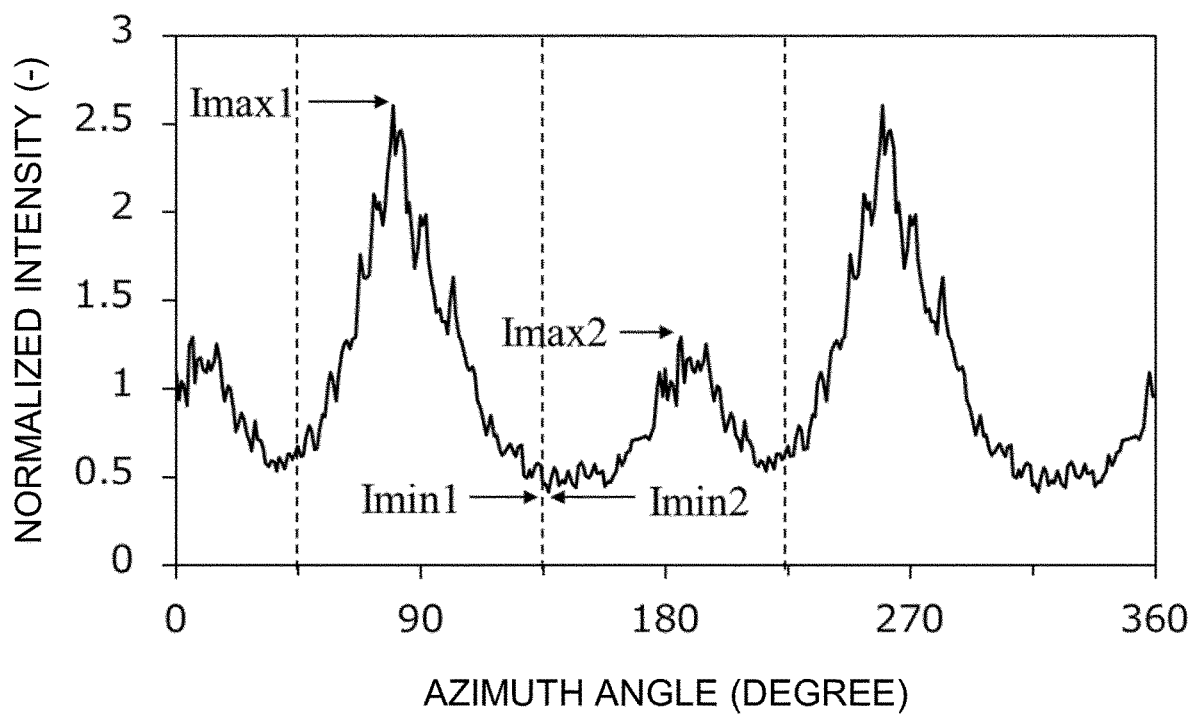
FIG. 4 is a diagram illustrating an example of how to obtain a maximum value and a minimum value that are used to obtain a maximum-to-minimum intensity ratio r.

(4) From each of the azimuthal profiles in the three different fields of view, a maximum value $I_{max1}$ and a minimum value $I_{min1}$ of the azimuth profile in a range of 45 degrees to 135 degrees, and a maximum value $I_{max2}$ and a minimum value $I_{min2}$ of the azimuth profile in a range of 135 degrees to 225 degrees are obtained, as shown in FIG. 4.

(5) With use of $I_{max1}$ $I_{min1}$, $I_{max2}$ and $I_{min2}$ in the three different fields of view, the maximum-to-minimum intensity ratio r is calculated for each of the three different fields of view by the following formula (A):

$$r=(I_{max1}/I_{min1}+I_{max2}/I_{min2})/2 \tag{A}$$

(6) An average value of the maximum-to-minimum intensity ratios r is calculated and is considered to be the maximum-to-minimum intensity ratio r.

The porous film in accordance with an embodiment of the present invention can satisfy both the requirement that the full width W at half maximum of the peak of the MD component is not less than 30 degrees and the requirement that the maximum-to-minimum intensity ratio r is not more than 3.6. The nonaqueous electrolyte secondary battery separator including the porous film satisfying the above two requirements makes it possible to more suitably enhance impact absorbency both in the TD and in the MD.

The porous film has an MD breaking elongation ratio of preferably not less than 20% GL (Gauge Length), and more preferably not less than 30% GL. An upper limit of the MD breaking elongation ratio is not particularly limited, and normally can be 300% GL or less. Further, the porous film has an MD breaking strength of preferably 20 MPa to 190 MPa, and more preferably 50 MPa to 150 MPa. The MD breaking elongation ratio and the MD breaking strength are measured by a method in conformance with the JIS K7127 standard.

Here, the MD breaking elongation ratio is expressed as a ratio (%) of (i) the length by which the porous film has elongated in the MD at the time the porous film breaks when carrying out a predetermined operation to (ii) the length in the MD of the porous film prior to carrying out the operation. Note that the predetermined operation is an operation to elongate the porous film in the MD.

The porous film has a TD breaking elongation ratio of preferably 20% GL to 300% GL, and more preferably 50% GL to 250% GL. Further, the porous film has a TD breaking strength of preferably 20 MPa to 190 MPa, and more preferably 50 MPa to 150 MPa. The TD breaking elongation ratio and the TD breaking strength are measured by a method in conformance with the JIS K7127 standard.

The TD breaking elongation ratio of the porous film can be expressed in the same manner as the MD breaking elongation ratio of the porous film. That is, the TD breaking elongation ratio is expressed as a ratio (%) of (i) the length by which the porous film has elongated in the TD at the time the porous film breaks when carrying out an operation to elongate the porous film in the TD to (ii) the length in the TD of the porous film prior to carrying out the operation.

However, in a sheet-type porous film, i.e., a porous film which has been processed to a predetermined size, it can be difficult to distinguish between the TD and the MD. In such a case, if the sheet-type porous film is rectangular, measurements can be carried out to determine (i) the breaking elongation ratio when the porous film is elongated in a direction parallel to one of the sides of the rectangle and (ii) the breaking elongation ratio when the porous film is elongated in a direction perpendicular to that side of the rectangle. Because a porous film typically has less strength with respect to elongation in the MD, out of the two breaking elongation ratios, the smaller value is considered to be the value of the MD breaking elongation ratio, and the larger value is considered to be the value of the TD breaking elongation ratio.

If the TD and MD of a porous film cannot be distinguished and the porous film is not rectangular in shape, the porous film can be elongated in a plurality of discretionarily chosen directions, and a breaking elongation ratio can be measured for each of the directions of elongation. Thereafter, out of the breaking elongation ratios measured, the smallest value is considered to be the value of the MD breaking elongation ratio. A direction perpendicular to the elongation direction used in the measurement of the MD breaking elongation ratio is considered to be the TD, and the breaking elongation ratio in that direction is considered to be the TD breaking elongation ratio. Note that in the present specification, the "shape" of a porous film refers to the shape of a surface of the porous film which surface is perpendicular to the thickness-wise direction of the porous film.

The porous film has a film thickness of preferably not less than 5 μm and less than 18 μm. The porous film having a film thickness of not less than 5 μm makes it possible to sufficiently prevent an internal short circuit in a battery. The porous film having a film thickness of less than 18 μm makes it possible to prevent the nonaqueous electrolyte secondary battery from being large in size.

The porous film having excessively large film thickness, for example, a film thickness of not less than 18 μm makes it possible to obtain a certain degree of impact resistance due to such a film thickness. However, such a configuration cannot meet a recent demand for thinner nonaqueous electrolyte secondary battery separators.

In contrast, the nonaqueous electrolyte secondary battery separator in accordance with an embodiment of the present invention having a film thickness of, for example, not less than 5 μm and less than 18 μm makes it possible to exhibit sufficient impact absorbency since it has a full width W at half maximum of a peak of the MD component of not less than 30 degrees and/or a maximum-to-minimum intensity ratio r of not more than 3.6.

The polyolefin-based resin more preferably contains a high molecular weight component having a weight-average molecular weight of $5\times10^5$ to $15\times10^6$. In particular, the polyolefin-based resin more preferably contains a high molecular weight component having a weight-average molecular weight of not less than 1,000,000, because such a resin improves the strength of the porous film and the nonaqueous electrolyte secondary battery separator including the porous film.

Further, in order that the full width W at half maximum of the peak of the MD component is controlled to be not less than 30 degrees and/or the maximum-to-minimum intensity ratio r is controlled to be not more than 3.6, the main component of the polyolefin-based resin is preferably polyolefin having a weight-average molecular weight of not less than 500,000. Note, here, that the "main component" means a component that accounts for not less than 50% by weight of the total weight of the polyolefin-based resin.

The polyolefin-based resin is not limited to a particular one, and possible examples encompass, for example, homopolymers and copolymers which are each obtained by polymerizing one or more monomers selected from monomers such as ethylene, propylene, 1-butene, 4-methyl-1-pentene, and 1-hexene.

Examples of such homopolymers encompass polyethylene, polypropylene, and polybutene. Examples of such copolymers encompass an ethylene-propylene copolymer.

Among the above examples, polyethylene is more preferable because use of polyethylene makes it possible to prevent a flow of an excessively large electric current at a lower temperature in the nonaqueous electrolyte secondary battery separator. Examples of the polyethylene encompass low-density polyethylene, high-density polyethylene, linear polyethylene (ethylene-α-olefin copolymer), and ultra-high molecular weight polyethylene having a weight-average molecular weight of not less than 1,000,000. Among these examples, the ultra-high molecular weight polyethylene having a weight-average molecular weight of not less than 1,000,000 is more preferable.

The polyolefin porous film typically has a weight per unit area of preferably 4 g/m² to 20 g/m², and more preferably 5 g/m² to 12 g/m², so as to allow a nonaqueous electrolyte secondary battery to have a higher weight energy density and a higher volume energy density.

The porous film has a puncture strength of preferably not less than 5.0 N, more preferably not less than 5.3 N, and even more preferably not less than 5.5 N. The porous film having a puncture strength of not less than 5.0 N means that the nonaqueous electrolyte secondary battery separator in accordance with an embodiment of the present invention has a sufficiently high strength. Thus, the puncture strength of not less than 5.0 N is preferable because such a puncture strength makes it possible to achieve more excellent impact absorbency. The puncture strength can be measured by the following method:

(i) The porous film is fixed on an upper surface of a stage with a washer having a diameter of 12 mm, and thereafter a pin (diameter of 1 mm; tip radius of 0.5R) is thrust into the porous film at a speed of 10 mm/sec to a depth of 10 mm. Note, here, that the stage is not limited in its shape, material, etc., as long as the upper surface of the stage is flat.

(ii) The maximum stress (gf) occurring when the pin is thrust into the porous film in (i) is measured, and the measured value is considered to be the puncture strength of the porous film.

The porous film has a porosity of preferably 20% by volume to 80% by volume, and more preferably 30% by volume to 75% by volume, so as to (i) retain a larger amount of electrolyte and (ii) obtain the function of reliably preventing (shutting down) a flow of an excessively large electric current at a lower temperature.

The porous film has an air permeability (Gurley value) per film thickness of 13 μm of preferably 50 sec·100 cc/13 μm to 200 sec·100 cc/13 μm, and more preferably 50 sec·100 cc/13 μm to 190 sec·100 cc/13 μm, from the viewpoint of keeping good ion permeability.

The pore diameter of each pore of the porous film is preferably not more than 0.3 μm and more preferably not more than 0.14 μm, from the viewpoint of (i) achieving sufficient ion permeability and (ii) preventing particles which constitute an electrode from entering the polyolefin porous film.

2. Method of Producing Polyolefin Porous Film

A method of producing a polyolefin porous film in an embodiment of the present invention is not limited to a particular method, and specific examples encompass a method including the following steps (A) to (D), a method including the following steps (A') to (C'), and a method including the following steps (A') to (D'):

(A) a step of obtaining a polyolefin resin composition by melting and kneading, in a kneader, a polyolefin-based resin and optionally an additive such as a pore forming agent;

(B) a step of obtaining a primary sheet by (i) extruding, from a T-die of an extruder, the polyolefin resin composition thus obtained and (ii) forming the polyolefin resin composition into a sheet by stretching the polyolefin resin composition in a first direction;

(C) a step of obtaining a secondary sheet by stretching the primary sheet in a second direction differing from the first direction;

(D) a step of stretching the secondary sheet in the second direction differing from the first direction, while causing the secondary sheet to shrink in the first direction;

(A') a step of obtaining a polyolefin resin composition by melting and kneading, in a kneader, a polyolefin-based resin and optionally a pore forming agent and an additive;

(B') a step of obtaining a resin sheet by extruding the polyolefin resin composition thus obtained from a T-die of an extruder, and, after cooling the resin sheet, stretching the resin sheet in a first direction through application of a linear pressure of 1.25 t/m to 7 t/m with use of a pair of rollers which is set at a temperature that is 5° C. to 20° C. higher than a melting point of the polyolefin-based resin, so that the resin sheet is formed into sheet form to obtain a primary sheet; and (C') a step of obtaining a secondary sheet by stretching the primary sheet in a second direction differing from the first direction at a temperature which is not higher than a melting point of the polyolefin-based resin; and (D') a step of shrinking the secondary sheet in the first and second directions at a temperature which is not higher than the melting point of the polyolefin-based resin.

Here, the melting point of the polyolefin resin can be obtained from a peak temperature in differential scanning calorimetry (DSC). Note that, when there are a plurality of peaks in the DSC, a peak temperature corresponding to the largest amount of heat of melting AH (J/g) is considered to be the melting point.

In the steps (A) and (A'), the polyolefin-based resin is used in an amount of preferably 6% by weight to 45% by weight, and more preferably 9% by weight to 36% by weight, with respect to 100% by weight of the polyolefin resin composition to be obtained. Further, the main component of the polyolefin has a weight-average molecular weight of not less than 500,000.

The polyolefin-based resin preferably contains a wax component having a weight-average molecular weight of 1,000 to 4,000. The polyolefin-based resin containing such a wax component allows the orientation of the molecular chains of the polyolefin in the porous film to be appropriately decreased. The wax component is not limited to any particular one, and examples of the wax component include polyethylene wax.

The first direction is preferably the MD. Further, the second direction is preferably the TD.

The pore forming agent is not limited to a particular one, and possible examples encompass plasticizers and inorganic bulking agents. The inorganic bulking agents are not limited to particular ones. Examples of the inorganic bulking agents encompass inorganic fillers and, specifically, calcium carbonate. The plasticizers are not limited to particular ones. Examples of the plasticizers encompass low molecular weight hydrocarbons such as liquid paraffin.

Examples of the additive encompass publicly known additives other than the pore forming agent, which additives can be optionally used to an extent that does not cause a deterioration in effects of the present invention. Examples of the publicly known additives encompass antioxidants.

In the steps (B) and (B'), the method of obtaining the primary sheet is not limited to a particular method. The primary sheet may be obtained by a sheet forming method such as inflation processing, calendering, T-die extrusion, or a Scaif method.

A sheet formation temperature in the sheet forming method, such as a T-die extrusion temperature in T-die extrusion, is preferably 200° C. to 280° C., and more preferably 220° C. to 260° C.

In the step (B), examples of methods for obtaining the primary sheet with a high degree of precision in terms of thickness encompass a method of roll-molding the polyolefin resin composition with use of a pair of rotational molding tools whose surface temperatures have been adjusted to be higher than the melting point of the polyolefin-based resin contained in the polyolefin resin composition. The surface temperature of the rotational molding tools is preferably not less than 5° C. higher than the melting point of the polyolefin-based resin. An upper limit of the surface temperature is preferably not more than 30° C. higher than the melting point of the polyolefin-based resin, and more preferably not more than 20° C. higher than the melting point of the polyolefin-based resin.

Examples of the pair of rotational molding tools encompass rollers and belts. The respective circumferential velocities of the two rotational molding tools do not necessarily have to be identical. The respective circumferential velocities need only be within approximately 5% of each other. The primary sheet may include a plurality of individual sheets obtained via the above sheet forming method which individual sheets have been laminated together.

When roll-molding the polyolefin resin composition with use of a pair of rotational molding tools, the polyolefin resin composition discharged in strand form may be introduced between the rotational molding tools directly from the extruder, or may first be formed into pellets.

A stretch ratio employed in the step (B) is preferably 1.1 times to 1.9 times, and more preferably 1.2 times to 1.8 times. A stretching temperature employed in the step (B) is preferably 120° C. to 160° C., and more preferably 130° C. to 155° C.

A stretch ratio employed in the step (B') is preferably 4 times to 15 times, and more preferably 5 times to 10 times. A stretching temperature employed in the step (B') is preferably 120° C. to 160° C., and more preferably 130° C. to 155° C.

The method of cooling the polyolefin resin composition in the steps (B) and (B') may be, for example, a method of bringing the polyolefin resin composition into contact with a cooling medium such as cool air or coolant water, or a method of bringing the polyolefin resin composition into contact with a cooling roller. The method of involving contact with a cooling roller is preferable.

The first direction in the steps (B) and (B') is preferably the MD. Setting the first direction to be the MD in the step (B) is preferable since doing so makes it possible, in a "relaxation operation" (described later), to improve the strength of the porous film with respect to elongation in the MD (which is normally the direction of least strength) and to efficiently improve the strength of the entire porous film with respect to elongation.

If the polyolefin resin composition and the primary sheet contain a pore forming agent, the method of producing the polyolefin porous film includes a step of removing the pore forming agent by cleaning the stretched sheet with use of cleaning liquid. The step of removing the pore forming agent is performed between the steps (B) and (C), after the step (C), between the steps (B') and (C'), or after the step (C').

The cleaning liquid is not limited to a particular one, as long as it is a solvent capable of removing the pore forming agent. Examples of the cleaning liquid encompass an aqueous hydrochloric acid solution, heptane, and dichloromethane.

In the step (C), the stretching temperature employed when performing stretching in the second direction is preferably 80° C. to 140° C., and more preferably 90° C. to 135° C.

In the steps (C) and (C'), the stretch ratio employed when performing stretching in the second direction is preferably 2 times to 12 times, and more preferably 3 times to 10 times.

In the steps (D) and (D'), the step of starting stretching the secondary sheet in the second direction and the step of shrinking the secondary sheet in the first direction may be carried out simultaneously. Alternatively, the steps may be carried out such that either one of the steps is carried out first, and then the other step is carried out. However, it is preferable to carry out the steps simultaneously or to carry out first the step of starting stretching the secondary sheet in the second direction. In this case, stretching the secondary sheet in the second direction causes a shrinkage force in the first direction to act on the secondary sheet. This makes it possible to shrink the secondary sheet without wrinkles.

In the steps (D) and (D'), the stretching temperature employed when causing the secondary sheet to shrink in the first direction is preferably 80° C. to 140° C., and more preferably 90° C. to 130° C. Further, a shrinkage ratio employed when shrinking the secondary sheet in the first direction is preferably 10% to 50%, and more preferably 20% to 40%.

In the steps (D) and (D'), the stretch ratio employed when stretching the secondary sheet in the second direction is preferably 1.2 times to 2 times, and more preferably 1.3 times to 1.5 times.

Here, in the steps (D) and (D'), shrinking the secondary sheet in the first direction makes it possible to return the polyolefin molecular chains that have been fully stretched during rolling to their original state such that the polyolefin molecular chains are not fully stretched. As a result, it is possible to suitably decrease the orientation of the polyolefin molecular chains in the porous film.

Further, it is preferable to employ an aspect such that a stretch ratio at which the secondary sheet is stretched in the second direction in the step (D) is as low as possible as compared to the stretch ratio at which the primary sheet is stretched in the second direction in the step (C). For example, it is preferable that the stretch ratio in the step (D) is controlled to be a stretch ratio to such an extent that no wrinkles are generated in the porous film to be obtained. This makes it possible to more suitably decrease the orientation of the polyolefin molecular chains in the porous film to be obtained.

Further, in the step (B'), stretching is carried out at a pressure that is a linear pressure of 1.25 t/m to 7 t/m and preferably 1.25 t/m to 6 t/m and at a temperature that is 5° C. to 20° C. higher than the melting point of the polyolefin-based resin. Here, the linear pressures in the above range are lower than a general linear pressure applied when the resin sheet is stretched during the production of the porous film. Thus, the polyolefin molecular chains are not fully stretched during rolling. Therefore, it is possible to suitably decrease the orientation of the polyolefin molecular chains in the porous film to be obtained.

As described above, the method including the steps (A) to (D), the method including the steps (A') to (C'), and the method including the steps (A') to (D') make it possible to produce the porous film that has the full width W at half maximum of the peak of the MD component of not less than 30 degrees and/or the maximum-to-minimum intensity ratio r of not more than 3.6.

3. Porous Layer

The nonaqueous electrolyte secondary battery separator in accordance with an embodiment of the present invention may be a nonaqueous electrolyte secondary battery laminated separator that includes the polyolefin porous film and a porous layer formed on one surface or on both surfaces of the polyolefin porous film.

The porous layer is a resin layer containing a resin. The porous layer is preferably a heat-resistant layer or an adhesive layer. It is preferable that the resin of which the porous layer is made be insoluble in the electrolyte of the battery and be electrochemically stable when the battery is in normal use.

If the porous layer is formed on one surface of the polyolefin porous film, the porous layer is preferably formed on a surface of the polyolefin porous film which surface faces a positive electrode of a nonaqueous electrolyte secondary battery to be produced, and more preferably on a surface of the polyolefin porous film which surface comes into contact with the positive electrode.

Examples of the resin encompass polyolefins, (meth) acrylate-based resins, fluorine-containing resins, polyamide-based resins, polyimide-based resins, polyester-based resins, rubbers, resins with a melting point or glass transition temperature of not lower than 180° C., water-soluble polymers, polycarbonate, polyacetal, and polyether ether ketone.

Of the above resins, polyolefins, (meth)acrylate-based resins, fluorine-containing resins, polyamide-based resins, polyester-based resins, and water-soluble polymers are preferable.

Preferable examples of the polyolefins encompass polyethylene, polypropylene, polybutene, and an ethylene-propylene copolymer.

Examples of the fluorine-containing resins encompass polyvinylidene fluoride, polytetrafluoroethylene, a vinylidene fluoride-hexafluoropropylene copolymer, a tetrafluoroethylene-hexafluoropropylene copolymer, a tetrafluoroethylene-perfluoroalkyl vinyl ether copolymer, a vinylidene fluoride-tetrafluoroethylene copolymer, a vinylidene fluoride-trifluoroethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, and an ethylene-tetrafluoroethylene copolymer. Particular examples of the fluorine-containing resins encompass fluorine-containing rubber having a glass transition temperature of not higher than 23° C.

As the polyamide-based resins, aramid resins such as aromatic polyamides and wholly aromatic polyamides are preferable.

Specific examples of the aramid resins encompass poly (paraphenylene terephthalamide), poly(metaphenylene isophthalamide), poly(parabenzamide), poly(metabenzamide), poly(4,4'-benzanilide terephthalamide), poly(paraphenylene-4,4'-biphenylene dicarboxylic acid amide), poly (metaphenylene-4,4'-biphenylene dicarboxylic acid amide), poly(paraphenylene-2,6-naphthalene dicarboxylic acid amide), poly(metaphenylene-2,6-naphthalene dicarboxylic acid amide), poly(2-chloroparaphenylene terephthalamide), a paraphenylene terephthalamide/2,6-dichloroparaphenylene terephthalamide copolymer, a metaphenylene terephthalamide/2,6-dichloroparaphenylene terephthalamide copolymer, poly(4,4'-diphenylsulfonyl terephthalamide), and a paraphenylene terephthalamide/4,4'-diphenylsulfonyl terephthalamide copolymer. Among these aramid resins, poly(paraphenylene terephthalamide) is more preferable.

It is possible to use only one of the above resins, or two or more of the above resins in combination.

The porous layer may contain fine particles. The term "fine particles" herein means organic fine particles or inorganic fine particles generally referred to as a filler. The fine particles are preferably electrically insulating fine particles.

Examples of the organic fine particles encompass resin fine particles. Examples of the inorganic fine particles encompass fillers made of inorganic matter such as calcium carbonate, talc, clay, kaolin, silica, hydrotalcite, diatomaceous earth, magnesium carbonate, barium carbonate, calcium sulfate, magnesium sulfate, barium sulfate, aluminum hydroxide, boehmite, magnesium hydroxide, calcium oxide, magnesium oxide, titanium oxide, titanium nitride, alumina (aluminum oxide), aluminum nitride, mica, zeolite, and glass. It is possible to use only one type of the above fine particles, or two or more types of the above fine particles in combination.

The porous layer contains the fine particles in an amount of preferably 1% by volume to 99% by volume, and more preferably 5% by volume to 95% by volume, with respect to 100% by volume of the porous layer.

The porous layer has a thickness of preferably 0.5 µm to 15 µm per layer, and more preferably 1 µm to 10 µm per layer. Setting the thickness of the porous layer to be not less than 0.5 µm per layer makes it possible to sufficiently prevent an internal short circuit caused by, for example, breakage of the nonaqueous electrolyte secondary battery, and also to retain a sufficient amount of the electrolyte in the porous layer. Setting the thickness of the porous layer to be not more than 15 µm per layer makes it possible to reduce or prevent a decrease in a rate characteristic or cycle characteristic.

The weight per unit area of the porous layer is preferably 0.33 $g/m^2$ to 10 $g/m^2$ per layer and more preferably 0.7 $g/m^2$ to 7 $g/m^2$ per layer.

For the purpose of achieving sufficient ion permeability, the porosity of the porous layer is preferably 20% by volume to 90% by volume, and more preferably 30% by volume to 80% by volume. In order for the nonaqueous electrolyte secondary battery laminated separator to have sufficient ion permeability, the pore diameter of each pore of the porous layer is preferably not more than 3 µm, and more preferably not more than 1 µm.

The nonaqueous electrolyte secondary battery laminated separator has a thickness of preferably 5.5 µm to 45 µm and more preferably 6 µm to 25 µm.

The nonaqueous electrolyte secondary battery laminated separator has an air permeability of preferably 100 sec/100 cc to 350 sec/100 cc and more preferably 100 sec/100 cc to 300 sec/100 cc, in terms of Gurley values.

The nonaqueous electrolyte secondary battery laminated separator has a puncture strength of preferably not less than 2.5 N, more preferably not less than 3.0 N, and even more preferably not less than 3.5 N. The puncture strength is measured using a method similar to that used for the porous film.

The nonaqueous electrolyte secondary battery separator in accordance with an embodiment of the present invention may include, as necessary, another porous layer other than the porous film and the porous layer, provided that the other porous layer does not prevent attainment of an object of an embodiment of the present invention. Examples of the other porous layer encompass publicly known porous layers such as a heat-resistant layer, an adhesive layer, and a protective layer.

4. Method of Producing Porous Layer and Nonaqueous Electrolyte Secondary Battery Laminated Separator A method of producing the porous layer in an embodiment of the present invention and the nonaqueous electrolyte secondary battery laminated separator in accordance with an embodiment of the present invention may be, for example, a method involving: applying a coating solution to one or both surfaces of the porous film, the coating solution containing the resin contained in the porous layer; and depositing the porous layer by drying the coating solution.

The coating solution contains a resin to be contained in the porous layer. The coating solution may contain the above-described fine particles which may be contained in the porous layer. The coating solution can be prepared typically by (i) dissolving, in a solvent, the resin that can be contained in the porous layer and (ii) dispersing, in the solvent, the fine particles. The solvent in which the resin is to be dissolved is not limited to any particular one and also serves as a dispersion medium in which the fine particles are to be dispersed. Depending on the solvent, the resin may be an emulsion.

The coating solution may be formed by any method, provided that the coating solution can satisfy conditions, such as a resin solid content (resin concentration) and/or a fine particle amount, which are necessary for obtaining a desired porous layer.

A method of applying the coating solution to the porous film is not limited to any particular one. As the coating solution applying method, a conventionally publicly known method can be employed. Specific examples of such a method include a gravure coater method, a dip coater method, a bar coater method, and a die coater method.

Embodiment 2: Nonaqueous Electrolyte Secondary Battery Member, Embodiment 3: Nonaqueous Electrolyte Secondary Battery A nonaqueous electrolyte secondary battery member in accordance with Embodiment 2 of the present invention includes a positive electrode, the nonaqueous electrolyte secondary battery separator in accordance with Embodiment 1 of the present invention, and a negative electrode, the positive electrode, the nonaqueous electrolyte secondary battery separator, and the negative electrode being arranged in this order.

A nonaqueous electrolyte secondary battery in accordance with Embodiment 3 of the present invention includes the nonaqueous electrolyte secondary battery separator in accordance with Embodiment 1 of the present invention.

The nonaqueous electrolyte secondary battery can be, for example, a nonaqueous secondary battery that achieves an electromotive force through doping with and dedoping of lithium, and can include a nonaqueous electrolyte secondary battery member including (i) a positive electrode, (ii) the nonaqueous electrolyte secondary battery separator, and (iii) a negative electrode, the positive electrode, the nonaqueous electrolyte secondary battery separator, and the negative electrode being arranged in this order. Note that constituent elements of the nonaqueous electrolyte secondary battery other than the nonaqueous electrolyte secondary battery separator are not limited to those described below.

The nonaqueous electrolyte secondary battery is typically configured so that a battery element is enclosed in an exterior member, the battery element including (i) a structure in which the negative electrode and the positive electrode face each other and sandwich the nonaqueous electrolyte secondary battery separator and (ii) an electrolyte with which the structure is impregnated. The nonaqueous electrolyte secondary battery is particularly preferably a lithium-ion secondary battery. Note that the doping refers to occlusion, support, adsorption, or insertion, and refers to a phenomenon in which lithium ions enter an active material of an electrode (e.g., a positive electrode).

The nonaqueous electrolyte secondary battery member includes the nonaqueous electrolyte secondary battery separator. As such, the nonaqueous electrolyte secondary battery member brings about the effect of making it possible to produce a nonaqueous electrolyte secondary battery having excellent safety, for example, excellent safety against an impact from outside.

The nonaqueous electrolyte secondary battery includes the nonaqueous electrolyte secondary battery separator. As such, the nonaqueous electrolyte secondary battery brings about the effect of having excellent safety, for example, excellent safety against an impact from outside.

1. Positive Electrode

The positive electrode included in (i) the nonaqueous electrolyte secondary battery member and (ii) the nonaqueous electrolyte secondary battery is not limited to a particular one, provided that the positive electrode is one that is typically used in a nonaqueous electrolyte secondary battery. Examples of the positive electrode encompass a positive electrode sheet having a structure in which an active material layer, containing a positive electrode active material and a binding agent, is formed on an electrode current collector. The active material layer may further contain an electrically conductive agent.

Examples of the positive electrode active material encompass materials capable of being doped with and dedoped of lithium ions. Specific examples of such materials encompass lithium complex oxides each containing at least one transition metal such as V, Mn, Fe, Co, or Ni.

Examples of the electrically conductive agent encompass carbonaceous materials such as natural graphite, artificial graphite, cokes, carbon black, pyrolytic carbons, carbon fiber, and a fired product of an organic polymer compound. Each of these electrically conductive agents can be used solely. Alternatively, two or more of these electrically conductive agents can be used in combination.

Examples of the binding agent encompass (i) fluorine-based resins such as polyvinylidene fluoride, (ii) acrylic resin, and (iii) styrene butadiene rubber. Note that the binding agent also serves as a thickener.

Examples of the positive electrode current collector encompass electric conductors such as Al, Ni, and stainless steel. Among these, Al is preferable because Al is easily processed into a thin film and is inexpensive.

Examples of a method for producing the positive electrode in sheet form encompass: a method in which a positive electrode active material, an electrically conductive agent, and a binding agent are pressure-molded on a positive electrode current collector; and a method in which (i) a positive electrode active agent, an electrically conductive agent, and a binding agent are formed into a paste with the use of a suitable organic solvent, (ii) then, a positive electrode current collector is coated with the paste, and (iii) subsequently, the paste is dried and then pressured so that the paste is firmly fixed to the positive electrode current collector.

2. Negative Electrode

The negative electrode included in (i) the nonaqueous electrolyte secondary battery member and (ii) the nonaqueous electrolyte secondary battery is not limited to a particular one, provided that the negative electrode is one that is typically used in a nonaqueous electrolyte secondary battery. Examples of the negative electrode encompass a negative electrode sheet having a structure in which an active material layer, containing a negative electrode active material and a binding agent, is formed on an electrode current collector. The active material layer may further contain an electrically conductive agent.

Examples of the negative electrode active material encompass (i) materials capable of being doped with and dedoped of lithium ions, (ii) a lithium metal, and (iii) a lithium alloy. Examples of the materials capable of being doped with and dedoped of lithium ions encompass carbonaceous materials. Examples of the carbonaceous materials encompass natural graphite, artificial graphite, cokes, carbon black, and pyrolytic carbons.

Examples of the negative electrode current collector encompass Cu, Ni, and stainless steel. Among these, Cu is more preferable because Cu is not easily alloyed with lithium especially in a lithium secondary battery and is easily processed into a thin film.

Examples of a method for producing the negative electrode in sheet form encompass: a method in which a negative electrode active material is pressure-molded on a negative electrode current collector; and a method in which (i) a negative electrode active material is formed into a paste with the use of a suitable organic solvent, (ii) then, a negative electrode current collector is coated with the paste, and (iii) subsequently, the paste is dried and then pressured so that the paste is firmly fixed to the negative electrode current collector. The paste preferably contains the electrically conductive agent and the binding agent.

3. Nonaqueous Electrolyte

A nonaqueous electrolyte in the nonaqueous electrolyte secondary battery is not limited to any particular one, provided that the nonaqueous electrolyte is one that is generally used for a nonaqueous electrolyte secondary battery. The nonaqueous electrolyte can be one prepared by, for example, dissolving a lithium salt in an organic solvent. Examples of the lithium salt encompass $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2BioCl_{10}$, lower aliphatic carboxylic acid lithium salt, and $LiAlCl_4$. It is possible to use only one kind of the above lithium salts or two or more kinds of the above lithium salts in combination.

Examples of the organic solvent to be contained in the nonaqueous electrolyte encompass carbonates, ethers, esters, nitriles, amides, carbamates, and sulfur-containing compounds, and fluorine-containing organic solvents each obtained by introducing a fluorine group into any of these organic solvents. It is possible to use only one kind of the above organic solvents or two or more kinds of the above organic solvents in combination.

EXAMPLES

The following description will discuss embodiments of the present invention in greater detail with reference to Examples and Comparative Examples. Note, however, that the present invention is not limited to the following Examples and Comparative Examples below.

[Measurement Methods]

The methods described below were used to measure physical properties and the like of the nonaqueous electrolyte secondary battery separators (porous films) produced in Examples 1 to 4 and in Comparative Examples 1 to 3.

[Thickness of Film]

The thickness (μm) of the nonaqueous electrolyte secondary battery separator was measured with the use of a high-precision digital measuring device (VL-50) manufactured by Mitutoyo Corporation.

[Weight Per Unit Area]

From the nonaqueous electrolyte secondary battery separator, a sample measuring 6.4 cm×4 cm was cut out, and the weight W (g) of the sample was measured. The following formula (C) was then used to calculate the weight (g/m$^2$) per unit area of the nonaqueous electrolyte secondary battery separator.

$$\text{Weight per unit area} = W/(0.064 \times 0.04) \quad (C)$$

[Air Permeability]

From the nonaqueous electrolyte secondary battery separator, a sample measuring 60 mm×60 mm was cut out. The air permeability of the sample was measured in conformance with JIS P8117. Then, the measured value of the air permeability was converted into an air permeability in terms of a film thickness of 13 μm. Specifically, when the measured value of the air permeability is "a" and the film thickness of the sample is "b" μm, the air permeability in terms of a film thickness of 13 μm was calculated based on the following formula (D).

$$\text{Air permeability in terms of film thickness of } 13\mu m = a \times (13/b) \quad (D)$$

[Puncture Strength]

The puncture strength of the nonaqueous electrolyte secondary battery separator was measured by the method described earlier under "1. Nonaqueous electrolyte secondary battery separator". Then, the measured value of the puncture strength was converted into a puncture strength in terms of a film thickness of 13 μm. Specifically, when the measured value of the puncture strength is "c" and the film thickness of the sample used for the puncture strength measurement is "d" μm, the puncture strength in terms of a film thickness of 13 μm was calculated based on the following formula (E).

$$\text{Puncture strength in terms of film thickness of } 13\mu m = c \times (13/d) \quad (E)$$

[Breaking Elongation Ratio and Breaking Strength]

The breaking elongation ratio and the breaking strength of the nonaqueous electrolyte secondary battery separator were measured in conformance with the JIS K7127 standard. Specifics of the measurement method are as follows.

The nonaqueous electrolyte secondary battery separator was punched out with a JIS K6251-3 dumbbell (distance between marked lines 20 mm, width of 5 mm) such that the MD was a longitudinal direction of the nonaqueous electrolyte secondary battery separator, so that a measurement sample was obtained. The sample was elongated in the MD, and the breaking strength and the elongation at a breaking point when the nonaqueous electrolyte secondary battery separator broke were measured. An average of the measured values of the breaking strength obtained by carrying out the measurement twice and an average of the measured values of the elongation at a breaking point obtained by carrying out the measurement twice were considered to be the MD breaking strength and the MD breaking elongation ratio, respectively.

At the measurement of the TD breaking strength and the TD breaking elongation ratio, the nonaqueous electrolyte secondary battery separator was punched out with a JIS K6251-3 dumbbell such that the TD was a longitudinal direction of the nonaqueous electrolyte secondary battery separator, so that a measurement sample was obtained. Then, the sample was elongated in the TD. Except for this point, the TD breaking strength and the TD breaking elongation ratio were measured by the same method as that for the MD breaking strength and the MD breaking elongation ratio.

[Charpy Test: Measurement of Absorbed Impact Energy]

From the nonaqueous electrolyte secondary battery separator, 10 strip-shaped samples each measuring 80 mm×10 mm and having a longitudinal direction along the MD were cut out. Charpy test was carried out in conformance with JIS K7111-1 (2012). A value obtained by dividing an average of the measured values obtained by carrying out the measurement 10 times by the weight per unit area of the sample was considered to be the absorbed impact energy in the MD. As the weight per unit area of the sample, the weight per unit area of the nonaqueous electrolyte secondary battery separator was used.

Except that 10 strip-shaped samples each measuring 80 mm×10 mm and having a longitudinal direction along the TD were cut out, Charpy test was carried out by a method similar to the method employed for the strip-shaped samples having a longitudinal direction along the MD. A value obtained by dividing an average of the measured values obtained by carrying out the measurement 10 times by the weight per unit area of the sample was considered to be the absorbed impact energy in the TD.

[Full Width W at Half Maximum of Peak of MD Component]

Wide-angle X-ray scattering measurement of the nonaqueous electrolyte secondary battery separator (porous film) was carried out under the conditions described below, and the full width W at half maximum of the peak of the MD component was calculated by the method described earlier under "1. Nonaqueous electrolyte secondary battery separator". Note that the polyolefin of which the porous films described in Examples 1 to 3 and Comparative Examples 1 to 3 were made was polyethylene. Thus, the scattering peak on the (110) plane of an orthorhombic crystal of the polyethylene polymer was detected at the positions corresponding to the scattering angles 2θ of 20 degrees to 23 degrees.

Model: Nano Viewer manufactured by Rigaku Corporation

Tube: Cu-Kα

Voltage: 40 kV

Current: 20 mA

Beam diameter: 0.25 mm

Detector: PILATUS 100k

[Maximum-to-Minimum Intensity Ratio r]

The nonaqueous electrolyte secondary battery separator (porous film) was observed by SEM under the conditions described below, and the maximum-to-minimum intensity ratio r was calculated by the method described earlier under "1. Nonaqueous electrolyte secondary battery separator".

Acceleration voltage: 2 kV

Magnification: 5000 times

Example 1

First, prepared was a mixture containing: 70% by weight of ultra-high molecular weight polyethylene powder (GUR4032, manufactured by Ticona); and 30% by weight of a polyethylene wax having a weight-average molecular weight of 1,000 (FNP-0115, manufactured by Nippon Seiro Co., Ltd.). Then, 0.4 parts by weight of an antioxidant (SONGNOX 1010, manufactured by Songwon Japan K.K.), 0.1 parts by weight of an antioxidant (IRGAFOS 168, manufactured by BASF), and 1.3 parts by weight of sodium stearate were added to 100 parts by weight of the mixture of (i) the ultra-high molecular weight polyethylene and (ii) the polyethylene wax, so as to obtain a second mixture.

Then, calcium carbonate having an average particle diameter of 0.1 μm (manufactured by Maruo Calcium Co., Ltd.)

was added to the second mixture such that the volume of the calcium carbonate was 38% by volume with respect to the entire volume of a resultant mixture. The resultant mixture in the form of powder was mixed with a Henschel mixer, and was then melted and kneaded in a twin screw kneading extruder. In this way, a polyolefin resin composition was obtained.

The polyolefin resin composition was extruded by a single-screw extruder to obtain a resin sheet, the resin sheet thus obtained was rolled under a linear pressure of approximately 5 t/m by a pair of rollers which had a surface temperature set to 147° C., and thereafter, the resin sheet was stretched in the MD to 4.8 times at a temperature not lower than a melting point of the ultra-high molecular weight polyethylene powder, so that a polyolefin resin composition in sheet form was obtained. The polyolefin resin composition in sheet form thus obtained was immersed in an aqueous hydrochloric acid solution (containing 4 mol/L of hydrochloric acid and 0.5% by weight of a nonionic surfactant) to remove the calcium carbonate, so that a primary sheet was obtained. Here, the melting point of the ultra-high molecular weight polyethylene powder was 135° C.

Then, TD-wise ends of the primary sheet thus obtained were each held by a plurality of holding members that were arranged so as to be adjacent in the MD. Next, the primary sheet was stretched in the TD to a stretch ratio of 7.05 times, so that a film was obtained. The film obtained by stretching was subjected to a heat fixation process at a temperature of 122° C. over 0.3 minutes. In this way, a nonaqueous electrolyte secondary battery separator was obtained.

Example 2

The surface temperature of the rollers during the preparation of the resin sheet was changed to 151° C. Except for this point, a nonaqueous electrolyte secondary battery separator was obtained by a procedure similar to that in Example 1.

Example 3

The composition of the polyolefin-based resin composition was changed to 70% by weight of ultra-high molecular weight polyethylene powder (Decamylene, manufactured by Tosoh Corporation) and 30% by weight of polyethylene wax (EXCEREX 20700, manufactured by Mitsui Chemicals, Inc.) having a weight-average molecular weight of 2,000. Further, the calcium carbonate was changed to calcium carbonate having an average particle diameter of 0.07 μm (manufactured by Maruo Calcium Co., Ltd.). Except for these points, a nonaqueous electrolyte secondary battery separator was obtained by a procedure similar to that in Example 2. Here, the melting point of the ultra-high molecular weight polyethylene powder was 136° C.

Example 4

A polyolefin resin composition was obtained by a method similar to that in Example 3.

The polyolefin resin composition was extruded by a single-screw extruder to obtain a resin sheet, and the resin sheet thus obtained was rolled under a linear pressure of approximately 22 t/m by a pair of rollers which had a surface temperature set to 151° C., so that a polyolefin resin composition in sheet form was obtained. The polyolefin resin composition in sheet form thus obtained was immersed in an aqueous hydrochloric acid solution (containing 4 mol/L of hydrochloric acid and 0.5% by weight of a nonionic surfactant) to remove the calcium carbonate, so that a primary sheet was obtained.

Then, TD-wise ends of the primary sheet thus obtained were each held by a plurality of holding members that were arranged so as to be adjacent in the MD. The primary sheet was stretched in the TD to a stretch ratio of 3.57 times, so that a secondary sheet was obtained.

Next, TD-wise ends of the secondary sheet were each held by a plurality of holding members that were arranged so as to be adjacent in the MD. Further, the secondary sheet was stretched at a temperature of 115° C. in the TD to a stretch ratio of 1.4 times by increasing the distance between holding members that were opposite each other in the TD. At the same time, the secondary sheet was relaxed in the MD by decreasing the distance between the holding members that were adjacent in the MD. In this way, a film was obtained. The film thus obtained was subjected to a heat fixation process at a temperature of 130° C. over 0.5 minutes. In this way, a nonaqueous electrolyte secondary battery separator was obtained. At this time, an MD relaxation ratio was 25%.

Note that the "MD relaxation ratio" refers to a rate of decrease of the length of the porous film in the MD with respect to the length of the secondary sheet in the MD before stretching.

Comparative Example 1

A polyolefin resin composition was obtained by a method similar to that in Example 1.

The polyolefin resin composition was extruded by a single-screw extruder to obtain a resin sheet, and the resin sheet thus obtained was rolled under a linear pressure of approximately 22 t/m by a pair of rollers which had a surface temperature set to 149° C., so that a polyolefin resin composition in sheet form was obtained. The polyolefin resin composition in sheet form thus obtained was immersed in an aqueous hydrochloric acid solution (containing 4 mol/L of hydrochloric acid and 0.5% by weight of a nonionic surfactant) to remove the calcium carbonate, so that a primary sheet was obtained.

Then, TD-wise ends of the primary sheet thus obtained were each held by a plurality of holding members that were arranged so as to be adjacent in the MD. Next, the primary sheet was stretched in the TD to a stretch ratio of 7.05 times, so that a film was obtained. The film obtained by stretching was subjected to a heat fixation process at a temperature of 123° C. over 0.3 minutes. In this way, a nonaqueous electrolyte secondary battery separator was obtained.

Comparative Example 2

A nonaqueous electrolyte secondary battery separator was obtained by the same method as in Example 2 of Japanese Patent No. 6647418.

Comparative Example 3

A commercially available dry separator (manufactured by Celgard, LLC) was considered to be a nonaqueous electrolyte secondary battery separator.

[Results]

The physical properties and the like of the obtained nonaqueous electrolyte secondary battery separators were measured by the above-mentioned methods. The results are shown in Tables 1 and 2.

TABLE 1

| | Film thickness [μm] | Air permeability expressed in terms of film thickness of 13 μm [sec · 100 cc/13 μm] | Puncture strength expressed in terms of film thickness of 13 μm [N] | MD breaking elongation ratio [%] | TD breaking elongation ratio [%] | MD breaking strength [MPa] | TD breaking strength [MPa] |
|---|---|---|---|---|---|---|---|
| Example 1 | 10 | 164 | 3.8 | 93 | 110 | 124 | 120 |
| Example 2 | 14 | 84 | 3.3 | 175 | 93 | 69 | 87 |
| Example 3 | 14 | 117 | 4.3 | 170 | 76 | 88 | 123 |
| Example 4 | 14 | 155 | 5.1 | 39 | 226 | 274 | 77 |
| Comparative Example 1 | 10 | 92 | 3.8 | 17 | 103 | 218 | 114 |
| Comparative Example 2 | 11 | 216 | 5.3 | 13 | 160 | 315 | 143 |
| Comparative Example 3 | 12 | 172 | 3.3 | 25 | 498 | 9 | 25 |

TABLE 2

| | Weight per unit area [g/m²] | Full width W at half maximum of peak of MD component [degree] | Maximum-to-minimum intensity ratio r | Absorbed impact energy in MD [J · m²/g] | Absorbed impact energy in TD [J · m²/g] |
|---|---|---|---|---|---|
| Example 1 | 4.9 | 45 | 2.4 | 0.033 | 0.040 |
| Example 2 | 6.6 | 44 | 3.1 | 0.066 | 0.047 |
| Example 3 | 6.8 | 31 | 2.5 | 0.058 | 0.039 |
| Example 4 | 7.8 | 62 | 2.2 | 0.024 | 0.073 |
| Comparative Example 1 | 4.6 | 24 | 4.7 | 0.016 | 0.015 |
| Comparative Example 2 | 6.0 | 29 | 5.0 | 0.013 | 0.024 |
| Comparative Example 3 | 5.6 | 9 | 8.1 | 0.014 | 0.002 |

As shown in Table 2, it can be understood that, in comparison to the nonaqueous electrolyte secondary battery separators of Comparative Examples 1 to 3, the nonaqueous electrolyte secondary battery separators of Examples 1 to 4 have excellent impact absorbency.

Thus, it was found that the nonaqueous electrolyte secondary battery separator in accordance with an embodiment of the present invention has excellent impact absorbency due to having the full width W at half maximum of the peak of the MD component of not less than 30 degrees and/or the maximum-to-minimum intensity ratio r of not more than 3.6.

INDUSTRIAL APPLICABILITY

An aspect of the present invention can be suitably used in producing a nonaqueous electrolyte secondary battery.

The invention claimed is:

1. A nonaqueous electrolyte secondary battery separator comprising:
   a polyolefin porous film,
   the polyolefin porous film satisfying any one or more of the following conditions (1) and (2):
   (1) a full width W at half maximum of a peak of an MD component is not less than 30 degrees, the full width W at half maximum of the peak being calculated from an azimuthal profile of a scattering peak on a (110) plane obtained by wide-angle X-ray scattering measurement that is carried out by irradiating a surface of the polyolefin porous film with an X-ray from a direction vertical to the surface of the polyolefin porous film, wherein, assuming that, in the azimuthal profile, a peak height is a difference between a maximum scattering intensity of a peak observed in a TD and a minimum scattering intensity of a valley which is adjacent to the peak and has a lowest intensity, the full width W at half maximum of the peak is a width of the peak at a scattering intensity at which the peak height is halved; and
   (2) a maximum-to-minimum intensity ratio r is not more than 3.6 in a Fourier transformed azimuthal profile obtained by observing the surface of the polyolefin porous film by a scanning electron microscope, wherein the maximum-to-minimum intensity ratio r is calculated, with use of a maximum value $I_{max1}$ and a minimum value $I_{min1}$ in a range of 45 degrees to 135 degrees and a maximum value $I_{max2}$ and a minimum value $I_{min2}$ in a range of 135 degrees to 225 degrees in the Fourier transformed azimuthal profile, by the following formula (A):

$$r = (I_{max1}/I_{min1} + I_{max2}/I_{min2})/2 \qquad (A).$$

2. The nonaqueous electrolyte secondary battery separator according to claim 1, wherein the polyolefin porous film satisfies the following (a) to (e):
   (a) a film thickness is not less than 5 μm and less than 18 μm;
   (b) an air permeability (Gurley value) per film thickness of 13 μm is 50 sec/100 cc to 200 sec/100 cc;
   (c) an MD breaking elongation ratio is not less than 20% GL;
   (d) an MD breaking strength is 50 MPa to 190 MPa; and
   (e) a TD breaking elongation ratio is 20% GL to 300% GL.

3. The nonaqueous electrolyte secondary battery separator according to claim 1, wherein the polyolefin porous film contains a wax component having a weight-average molecular weight of 1,000 to 4,000.

4. The nonaqueous electrolyte secondary battery separator according to claim 1, further comprising:

a porous layer containing a resin, the porous layer being formed on one surface or on both surfaces of the polyolefin porous film.

5. The nonaqueous electrolyte secondary battery separator according to claim 4, wherein the resin is an aramid resin.

6. A nonaqueous electrolyte secondary battery member comprising:

a positive electrode;

the nonaqueous electrolyte secondary battery separator according to claim 1; and a negative electrode, the positive electrode, the nonaqueous electrolyte secondary battery separator, and the negative electrode being arranged in this order.

7. A nonaqueous electrolyte secondary battery comprising:

the nonaqueous electrolyte secondary battery separator according to claim 1.

* * * * *